(12) United States Patent
Mallick et al.

(10) Patent No.: US 12,299,118 B2
(45) Date of Patent: May 13, 2025

(54) HOST MULTI-PATH LAYER WITH IO ANALYTICS FOR MALWARE DEFENSE

(71) Applicant: Dell Products L.P., Round Rock, TX (US)

(72) Inventors: Sanjib Mallick, Bangalore (IN); Arieh Don, Newton, MA (US); Elik Levin, Modi'ln (IL); Kundan Kumar, Bangalore (IN); Gaurav Singh, Satna (IN)

(73) Assignee: Dell Products L.P., Round Rock, TX (US)

( * ) Notice: Subject to any disclaimer, the term of this patent is extended or adjusted under 35 U.S.C. 154(b) by 392 days.

(21) Appl. No.: 17/732,620

(22) Filed: Apr. 29, 2022

(65) Prior Publication Data

US 2023/0351013 A1 Nov. 2, 2023

(51) Int. Cl.
*G06F 21/55* (2013.01)
*G06F 21/56* (2013.01)
*G06F 21/78* (2013.01)

(52) U.S. Cl.
CPC .......... *G06F 21/554* (2013.01); *G06F 21/552* (2013.01); *G06F 21/564* (2013.01); *G06F 21/568* (2013.01); *G06F 21/78* (2013.01)

(58) Field of Classification Search
CPC .................................................. G06F 21/554
See application file for complete search history.

(56) References Cited

U.S. PATENT DOCUMENTS

| 6,567,397 B1 | 5/2003 | Campana et al. |
| 6,687,746 B1 | 2/2004 | Shuster et al. |
| 6,697,875 B1 | 2/2004 | Wilson |

(Continued)

FOREIGN PATENT DOCUMENTS

| CN | 103677927 B | 2/2017 |
| EP | 1117028 A2 | 7/2001 |
| EP | 2667569 A1 | 11/2013 |

OTHER PUBLICATIONS

International Search Report and Written Opinion of PCT/US2019/052549 dated Dec. 4, 2019, 13 pages.

(Continued)

*Primary Examiner* — Simon P Kanaan
(74) *Attorney, Agent, or Firm* — Ryan, Mason & Lewis, LLP

(57) ABSTRACT

An apparatus comprises at least one processing device configured to implement a multi-path layer in a host device, wherein the multi-path layer controls delivery of input-output (IO) operations from the host device to a storage system over selected ones of a plurality of paths through a network. The multi-path layer is configured, for each of at least a subset of the IO operations, to store at least a process identifier, a user identifier and an access type for the IO operation. The multi-path layer is further configured to perform analytics on the stored process identifiers, user identifiers and access types to detect an access pattern, and responsive to the detected access pattern having one or more designated characteristics associated with malware, to generate an alert. The alert may be generated by inserting security alert indicators into respective ones of the IO operations, for extraction therefrom by the storage system.

20 Claims, 4 Drawing Sheets

(56) References Cited

U.S. PATENT DOCUMENTS

| | | |
|---|---|---|
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,055,582 B1 | 8/2018 | Weaver et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,609,066 B1 | 3/2020 | Nossik et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 11,030,314 B2 | 6/2021 | Kucherov et al. |
| 11,442,652 B1* | 9/2022 | Dailey .............. H04L 67/1097 |
| 11,803,453 B1* | 10/2023 | Bunker ................ G06F 3/0659 |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0021653 A1 | 1/2020 | Rao et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |
| 2021/0019054 A1 | 1/2021 | Anchi et al. |
| 2021/0026551 A1 | 1/2021 | Tidke et al. |
| 2021/0026650 A1 | 1/2021 | Rao et al. |
| 2021/0157502 A1 | 5/2021 | Rao et al. |
| 2021/0181965 A1 | 6/2021 | Anchi et al. |
| 2021/0303164 A1* | 9/2021 | Grunwald .............. G06F 3/0629 |
| 2022/0092180 A1* | 3/2022 | Richardson ............. G06F 21/64 |
| 2023/0185477 A1* | 6/2023 | Sillifant ................ G06F 3/0604 |
| | | 711/154 |
| 2023/0229764 A1* | 7/2023 | Vohra .................... G06F 21/568 |

OTHER PUBLICATIONS

International Search Report and Written Opinion of PCT/US2019/053204 dated Dec. 16, 2019, 40 pages.

International Search Report and Written Opinion of PCT/US2019/053473 dated Dec. 19, 2019, 16 pages.

International Search Report and Written Opinion of PCT/US2019/067144 dated May 4, 2020, 26 pages.

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

VMWARE, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMWARE, Inc. "VMware VMFS vol. Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

NVM Express, "NVM Express Base Specification, Revision 2.0a," NVM Express, Jul. 23, 2021, 454 pages.

* cited by examiner

HOST MULTI-PATH LAYER WITH IO ANALYTICS FOR MALWARE DEFENSE

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Such arrangements can be vulnerable to attacks involving ransomware and other types of malware. For example, it can be difficult under conventional practice for a storage system to determine if a particular application process running on a host device has been infected with malware. Data within the logical storage devices can therefore be vulnerable under such attacks.

SUMMARY

Illustrative embodiments disclosed herein provide techniques for implementing IO analytics for malware defense in a multi-path layer of one or more host devices. Such arrangements in some embodiments not only facilitate the detection of malware and the generation of associated alerts, but also the protection of logical storage devices of a corresponding storage array or other type of storage system from the detected malware. For example, in some embodiments, the multi-path layer of the one or more host devices collaborates with the storage system to implement highly efficient and effective defensive measures against ransomware and other types of malware.

In one embodiment, an apparatus comprises at least one processing device that includes a processor and a memory, with the processor being coupled to the memory. The at least one processing device is configured to implement a multi-path layer in a host device, wherein the multi-path layer controls delivery of IO operations from the host device to a storage system over selected ones of a plurality of paths through a network. The multi-path layer is configured, for each of at least a subset of the IO operations, to store at least a process identifier, a user identifier and an access type for the IO operation. The multi-path layer is further configured to perform analytics on the stored process identifiers, user identifiers and access types to detect an access pattern, and responsive to the detected access pattern having one or more designated characteristics associated with malware, to generate an alert.

In some embodiments, generating the alert comprises inserting security alert indicators into respective ones of the IO operations delivered from the host device to the storage system, to indicate that the detected access pattern for those IO operations has one or more designated characteristics associated with malware. Such "tagging" of IO operations can be performed by the multi-path layer as part of or otherwise in conjunction with inserting process identifiers into respective ones of the IO operations.

In some embodiments, the storage system is configured to receive the IO operations from the host device over the network, to extract the security alert indicators from respective ones of the received IO operations, and to perform a particular malware defense action for at least one logical storage volume based at least in part on the extracted security alert indicators.

For example, in some embodiments, performing a particular malware defense action for at least one logical storage volume based at least in part on the extracted security alert indicators comprises generating a snapshot of the logical storage volume.

Additionally or alternatively, performing a particular malware defense action for at least one logical storage volume based at least in part on the extracted security alert indicators comprises preventing the IO operations from modifying the logical storage volume.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
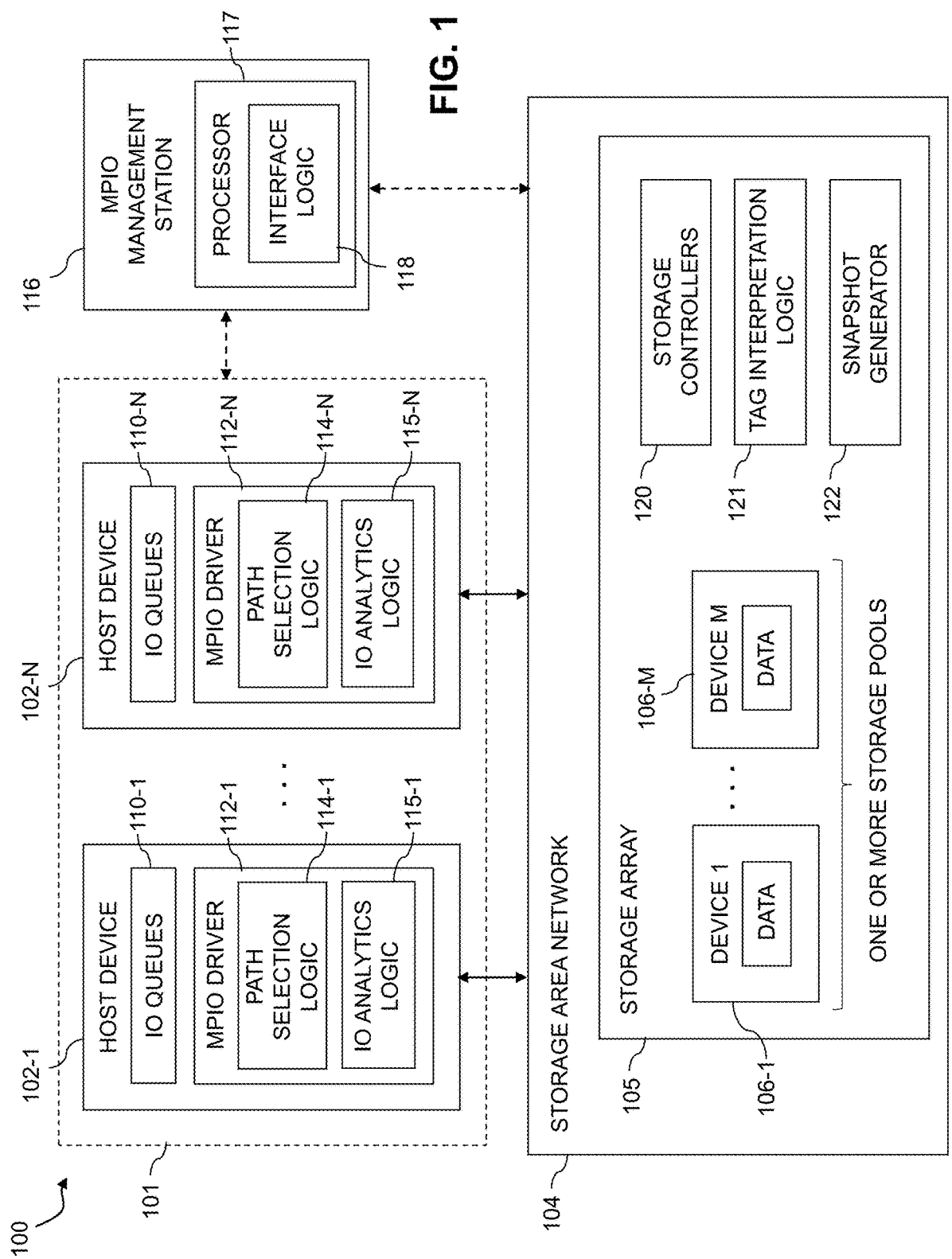
FIG. 1 is a block diagram of an information processing system comprising a host multi-path layer with IO analytics for malware defense in an illustrative embodiment.

FIG. 1 shows an information processing system 100 configured in accordance with an illustrative embodiment. The information processing system 100 comprises a computer system 101 illustratively comprising a plurality of host devices 102-1, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

In some embodiments, the storage array 105 more particularly comprises a distributed storage array that includes multiple storage nodes interconnected with one another, possibly in a mesh network arrangement. Such an arrangement is an example of what is more generally referred to herein as a "distributed storage system."

As will be described in more detail below, illustrative embodiments provide a multi-path layer that is configured to perform IO analytics on logs or other stored information characterizing IO operations generated by application processes executing on the host devices 102 in order to detect potentially malicious access patterns. Alerts are illustratively generated by the host devices 102 based at least in part to such detection and are provided to the storage array 105, and possibly to additional or alternative system components, to facilitate the performance of one or more malware defense actions in the storage array 105 for one or more logical storage volumes of the storage array 105.

The host devices 102 illustratively comprise respective computers, servers or other types of processing devices capable of communicating with the storage array 105 over the SAN 104. For example, at least a subset of the host devices 102 may be implemented as respective processing devices of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, ... 110-N and respective MPIO drivers 112-1, ... 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, ... 114-N implemented within the MPIO drivers 112. It is assumed in some embodiments that the MPIO drivers 112 are configured to insert process identifiers into respective ones of the IO operations prior to their delivery to the storage array 105, with such functionality also illustratively being performed by the instances of path selection logic 114 or by other portions of the MPIO drivers 112. The process identifier for a given IO operation illustratively indicates the particular application process, executing on one of the host devices 102, that generated the given IO operation.

The multi-path layer further includes functionality for storing, illustratively in one or more logs within or otherwise associated with the host devices 102, information such as a process identifier, a user identifier and an access type for each of the IO operations, and for performing analytics on the stored process identifiers, user identifiers and access types to detect access patterns. Such functionality is provided at least in part using respective instances of IO analytics logic 115-1, ... 115-N implemented within the MPIO drivers 112. Additional functionality that is illustratively implemented by the multi-path layer of the host devices 102 comprises functionality for generating one or more alerts responsive to a detected access pattern having one or more characteristics associated with malware. For example, IO operations from a potentially malicious process exhibiting a suspect access pattern can be tagged with security alert indicators, as part of or otherwise in conjunction with insertion of the above-noted process identifiers. These and other functions of the multi-path layer associated with malware detection and alerting are illustratively performed at least in part by the instances of IO analytics logic 115 of the MPIO drivers 112.

The inserted security alert indicators can be extracted by the storage array 105 and utilized by the storage array 105 to control performance of one or more malware defense actions for IO operations generated by the potentially malicious process. The security alert indicators are examples of what are more generally referred to herein as "alerts," and it is to be appreciated that additional or alternative alerts can be generated in other embodiments. In some embodiments, the security alert indicators comprise respective "tags" and insertion of such security alert indicators in respective IO operations is referred to as "tagging."

The MPIO drivers 112 may comprise, for example, otherwise conventional MPIO drivers, such as PowerPath® drivers from Dell Technologies, suitably modified in the manner disclosed herein to provide a host multi-path layer with IO analytics functionality for malware defense. Other types of MPIO drivers from other driver vendors may be suitably modified to incorporate such functionality as disclosed herein.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management station 116 that includes a processor 117 implementing interface logic 118. The interface logic 118 is utilized to communicate with the host devices 102 and the storage array 105. Such an MPIO management station 116 provides management functionality for the multi-path layer comprising the MPIO drivers 112 of the host devices 102. In some embodiments, host device management software executing on the MPIO management station 116 interacts with storage array management software executing on the storage array 105. The MPIO management station 116, or portions thereof, may be considered in some embodiments as forming part of what is referred to herein as a "multi-path layer" that includes the MPIO drivers 112 of the host devices 102. The term "multi-path layer" as used herein is intended to be broadly construed and may comprise, for example, an MPIO layer or other multi-path software layer of a software stack, or more generally multi-pathing software program code, running on one or more processing devices each comprising at least one processor and at least one memory.

The MPIO management station 116 is an example of what is more generally referred to herein as an "external server" relative to the storage array 105. Additional or alternative external servers of different types can be used in other embodiments. In some embodiments, one or more external servers, such as the MPIO management station 116, can be configured to perform at least a portion of the IO analytics functionality for malware defense as disclosed herein. For example, the MPIO management station 116 can provide information regarding application processes of the host devices 102 and associated process identifiers to the IO analytics logic 115 of the respective MPIO drivers 112.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value. A negotiated link speed is an example of what is more generally referred to herein as a "negotiated rate."

The negotiated rates of the respective initiator and target of a particular one of the paths illustratively comprise respective negotiated data rates determined by execution of at least one link negotiation protocol for that path. The link negotiation protocol is illustratively performed separately by the initiator and the target, and involves each such component separately interacting with at least one switch of a switch fabric of the SAN 104 in order to determine the negotiated rate, potentially leading to substantial mismatches in initiator and target negotiated rates for the same switch, set of switches or switch fabric of the SAN 104.

The term "negotiated rate" therefore illustratively comprises a rate negotiated between an initiator or a target and a switch of a switch fabric of the SAN 104. However, the term "negotiated rate" as used herein is intended to be broadly construed so as to also encompass, for example, arrangements that refer to negotiated speeds. Any of a wide variety of different link negotiation protocols can be used, including auto-negotiation protocols, as will be readily appreciated by those skilled in the art.

It is also to be appreciated that a wide variety of other types of rate negotiation may be performed in other embodiments.

Various host-side scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a vendor unique (VU) command, or combinations of multiple instances of these or other commands, in an otherwise standardized storage access protocol command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path. Such host registration operations are illustratively part of a "host registration process" as that term is broadly used herein.

The MPIO management station 116 is arranged as an intermediary device relative to the host devices 102 and the storage array 105. Some communications between the host devices 102 and the storage array 105 can occur via such an intermediary device, which as indicated elsewhere herein can alternatively comprise one or more external servers. Such communications illustratively involve utilization of an out-of-band communication mechanism, such as one or more IP connections between the host devices 102 and the MPIO management station 116.

As indicated previously, the host devices 102 communicate directly with the storage array 105 using one or more storage access protocols such as SCSI, Internet SCSI (iSCSI), SCSI over FC (SCSI-FC), NVMe over FC (NVMe/FC), NVMe over Fabrics (NVMeF), NVMe over TCP (NVMe/TCP), and/or others. The MPIO management station 116 in some embodiments is similarly configured to communicate directly with the storage array 105 using one or more such storage access protocols.

The MPIO driver 112-1 on the host device 102-1 illustratively has connectivity to the MPIO management station 116. The MPIO management station 116 in some embodiments implements PowerPath® Management Appliance (PPMA) functionality to obtain access to the host devices 102 and the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station 116.

Such host multi-pathing software can be configured to insert process identifiers into respective IO operations sent to the storage array 105 in order to facilitate various protection mechanisms in the storage array 105 as disclosed herein. For example, multi-pathing software residing on one or more of the host devices 102 (e.g., a server such as an ESXi server or an AIX server) is utilized in illustrative embodiments to insert process identifiers into respective IO operations sent by one or more of the host devices 102 to the storage array 105 for use in malware defense in the storage array 105. Such process identifiers in some embodiments include or are otherwise associated with security alert indicators, utilized herein by the host multi-pathing software to convey alerts to the storage array 105 for particular application processes that are exhibiting potentially malicious access patterns.

As indicated previously, information processing systems comprising host devices and storage arrays or other types of storage systems can be vulnerable to attacks involving ransomware and other types of malware. For example, it can be difficult under conventional practice for a storage system to determine if a particular application process running on a host device has been infected with malware. Data within the logical storage devices can therefore be vulnerable under such attacks.

Illustrative embodiments disclosed herein provide techniques for implementing IO analytics for malware defense in a multi-path layer of one or more host devices. Such arrangements in some embodiments not only facilitate the detection of malware and the generation of associated alerts, but also the protection of logical storage devices of a corresponding storage array or other type of storage system from the detected malware. For example, in some embodiments, the multi-path layer of the one or more host devices collaborates with the storage system to implement highly efficient and effective defensive measures against ransomware and other types of malware.

In the FIG. 1 embodiment, the storage array 105 comprises a plurality of storage controllers 120, tag interpretation logic 121, and a snapshot generator 122. In other embodiments, at least portions of one or more of the tag interpretation logic 121 and the snapshot generator 122 can be implemented at least in part external to the storage array 105 rather than internal to the storage array 105. For example, in some embodiments at least portions of the tag interpretation logic 121 and the snapshot generator 122 are implemented on one or more servers that are external to the storage array 105.

Accordingly, such logic components and related stored information may be located internal to the storage array 105, external to the storage array 105, or implemented in part internally and in part externally to the storage array 105, and can include various combinations of hardware, firmware and software. The term "logic" as used herein is therefore intended to be broadly construed.

As indicated above, at least portions of the communications between the host devices 102 and the storage array 105 can utilize an in-band communication mechanism in which one or more predetermined commands in a designated storage access protocol are sent from the host device 102-1 to the storage array 105. Such predetermined commands can comprise, for example, read and/or write commands, sense commands (e.g., log sense and/or mode sense commands), VU commands, or combinations of multiple instances of these or other commands, in an otherwise standardized command format, such as a SCSI format, an NVMe format, or other type of format. A "command" as the term is broadly used herein can comprise a combination of multiple distinct commands.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

Additional components not explicitly shown in the figure, such as one or more storage caches, may also be provided in the storage array 105 for use in processing JO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of JO operations.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 2.0a, July 2021, which is incorporated by reference herein. Other NVMe storage access protocols of this type that may be utilized in illustrative embodiments disclosed herein include NVMe/FC, NVMeF and NVMe/TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105.

As another illustration, in some embodiments, the IO operation priority queues are implemented as respective SLO-based queues. For example, the SLO-based queues illustratively may have respective different SLO levels, such as Diamond, Gold, Silver and Bronze, in this example arranged from a highest SLO to a lowest SLO, with higher SLOs having better response times than lower SLOs. The storage array 105 may be configured to provide different SLOs for different ones of the IO operations by assigning different ones of the IO operations to different ones of the SLO-based queues. The SLO-based queues are illustratively associated with respective SLOs for processing of IO operations in the storage array 105.

In these and other embodiments, process tags may be used in assigning different ones of the IO operations to different ones of the SLO-based queues or other IO operation priority queues of the storage array 105, as disclosed in U.S. Pat. No. 10,474,367, entitled "Storage System with Input-Output Performance Control Utilizing Application Process Detection," which is incorporated by reference herein. However, use of process tags is not required, and other techniques can be used to assign particular IO operations received in the storage array 105 to particular ones of the IO operation priority queues.

As mentioned above, communications between the host devices 102 and the storage array 105 may utilize PCIe connections or other types of connections implemented over one or more networks, using interfaces and protocols as previously described. Numerous other interfaces and associated protocols can be used in other embodiments.

The storage array 105 in some embodiments may be implemented as part of cloud infrastructure in the form of a cloud-based system. Such a cloud-based system can additionally or alternatively be used to implement other portions of system 100, such as the host devices 102 and the MPIO management station 116.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a distributed storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active arrangements, Asymmetric Logical Unit Access (ALUA) arrangements and/or Asymmetric Namespace Access (ANA) arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, and MPIO drivers 112, including their corresponding instances of path selection logic 114 and IO analytics logic 115, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

As indicated above, illustrative embodiments overcome various drawbacks of conventional practice by configuring the system 100 to include IO analytics functionality for malware defense, possibly utilizing process identifiers inserted in respective IO operations by one or more of the host devices 102, as will now be described in more detail. Such process identifiers in some embodiments include or are otherwise associated with security alert indicators that convey to the storage array 105 that the corresponding process has been detected as exhibiting a potentially malicious access pattern.

In operation, the MPIO driver 112-1 is configured to control delivery of IO operations from its corresponding host device 102-1 to storage array 105 over selected ones of a plurality of paths through SAN 104, using its path selection logic 114-1, where the paths are associated with respective initiator-target pairs, the initiators being implemented on the host device 102-1 and the targets being implemented on the storage array 105. The MPIO driver 112-1 is further configured to determine process identifiers, user identifiers and access types for the IO operations, and possibly additional or alternative information characterizing the IO operations, such as timestamps indicating times at which the IO operations were received by the MPIO driver 112-1. As described in more detail below, such information is utilized by the IO analytics logic 115 of the MPIO driver 112-1 to perform analytics, in order to detect potentially malicious access patterns and to generate corresponding alerts.

In some embodiments, the MPIO driver 112-1 inserts the above-noted process identifiers into respective corresponding ones of the IO operations before those IO operations are sent to the storage array 105. For example, the MPIO driver 112-1 is illustratively configured to insert the process identifiers into respective CDBs or other command structures of one or more commands of the IO operations. Other types of process identifier insertion can be performed in other embodiments. For example, a process identifier can be prepended to or appended to a corresponding IO operation. Such prepending or appending of a process identifier is intended to be encompassed by the term "identifier insertion" as that term is broadly used herein. A given such process identifier can comprise, for example, a process tag. Additional or alternative types of process identifiers, and combinations thereof, can be inserted into the given IO operation in other embodiments. The term "process identifier" as used herein is therefore intended to be broadly construed.

As indicated above, the MPIO driver 112-1 is configured, for each of the IO operations, to store at least a process identifier, a user identifier and an access type for the IO operation, to perform analytics on the stored process identifiers, user identifiers and access types to detect an access pattern, and responsive to the detected access pattern having one or more designated characteristics associated with malware, to generate an alert. At least a portion of this functionality is carried out by the IO analytics logic 115-1 of the MPIO driver 112-1, possibly in cooperation with the path selection logic 114-1.

The process identifiers illustratively indicate respective ones of one or more application processes that generated the IO operations on the host device 102-1, the user identifiers indicate particular users for which the application processes are executed in the host device 102-1, and the access types indicate for a given one of the IO operations whether the IO operation is a read operation or a write operation. Other types of process identifiers, user identifiers and access types can be used in other embodiments, and these terms as used herein are therefore intended to be broadly construed. These and other types of information characterizing the IO operations can be stored in one or more logs within or otherwise accessible to the host device 102-1 under the control of the MPIO driver 112-1.

In some embodiments, performing analytics on the stored process identifiers, user identifiers and access types in the IO analytics logic 115-1 of the MPIO driver 112-1 to detect an access pattern comprises determining a number of read operations directed to a particular logical storage volume within a given time interval, determining a number of write operations directed to the particular logical storage volume within the given time interval, and detecting the access pattern based at least in part on the determined number of read operations and the determined number of write operations.

Additionally or alternatively, performing analytics on the stored process identifiers, user identifiers and access types to detect an access pattern in some embodiments comprises identifying an access pattern characterized by at least one of the following:

1. A newly-created process performing both read operations and write operations directed to a particular logical storage volume.
2. A process that utilizes one or more scripts to perform both read operations and write operations directed to the particular logical storage volume.
3. A sequential access pattern comprising both read operations and write operations directed to the particular logical storage volume.
4. A substantial increase in usage of computation and memory resources of the host device.
5. A particular type of correlation between one or more original files and one or more modified files.

Other types of features can be used to characterize potentially malicious access patterns in other embodiments.

In some embodiments, the MPIO driver 112-1 is further configured to identify one or more suspect accesses based at least in part on the detected access pattern, to determine an entropy of one or more files targeted by the one or more suspect accesses, and to block further access of a corresponding process and user identifier responsive to the determined entropy being greater than a threshold entropy level.

The entropy in some embodiments comprises a Shannon entropy, which may be computed using well-known techniques, as will be appreciated by those skilled in the art. Other entropy measures can be used in other embodiments.

Some embodiments are configured to utilize machine learning in performing analytics on the stored process identifiers, user identifiers and access types to detect an access pattern. Such embodiments may be more particularly configured to train a machine learning model, and to utilize the trained machine learning model to detect the access pattern. An example of an embodiment of this type will be described below in conjunction with FIG. 4.

The MPIO driver 112-1 in some embodiments generates an alert responsive to a detection of a potentially malicious access pattern by inserting security alert indicators into respective ones of the IO operations delivered from the host device 102-1 to the storage array 105, in order to indicate to the storage array 105 that the detected access pattern for those IO operations has one or more designated characteristics associated with malware.

The storage array 105 receives the IO operations from the host device 102-1, extracts the security alert indicators from respective ones of the received IO operations, and performs a particular malware defense action for at least one logical storage volume based at least in part on the extracted security alert indicators.

In some embodiments, these functions are performed at least in part by the tag interpretation logic 121 of the storage array 105, with possible involvement of one or more of the storage controllers 120. As indicated previously, the inserted security alert indicators are in some embodiments herein referred to as "tags."

Accordingly, tag interpretation logic 121 is illustratively configured to process tags or other security alert indicators inserted into IO operations by the host device 102-1. Such tags can additionally or alternatively include process identifiers. In processing the tags, the tag interpretation logic 121 illustratively determines a particular malware defense action to be performed by the storage array 105 when the extracted tags indicate that the process that generated one or more of the IO operations has been determined by the IO analytics logic 115-1 to exhibit one or more designated characteristics associated with malware. Such a process is also referred to herein as a potentially malicious process. Any of a wide variety of different malware defense actions may be selected and initiated by the tag interpretation logic 121 based at least in part on the extracted security alert indicators.

For example, performing a particular malware defense action for at least one logical storage volume based at least in part on the extracted security alert indicators comprises generating a snapshot of the logical storage volume. Such a snapshot is illustratively generated by the snapshot generator 122 of the storage array 105, and preserves the state of the logical storage volume.

Additionally or alternatively, performing a particular malware defense action for at least one logical storage volume based at least in part on the extracted security alert indicators comprises preventing the IO operations from modifying the logical storage volume.

Other examples of malware defense actions that may be performed by the storage array 105 based at least in part on alerts generated by the MPIO driver 112-1 or other components of the host device 102-1 are described elsewhere herein.

The storage array 105 in some embodiments is illustratively configured to extract the security alert indicators in conjunction with extraction of process identifiers inserted into the IO operations by the MPIO driver 112-1. For example, in some embodiments, an additional bit or set of multiple bits can be appended to, prepended to or inserted in the process identifier to convey the security alert indicators. Thus, a "process identifier" as the term is broadly used herein can be configured not only to identify the particular process that generated the IO operation into which such an identifier is inserted, it can additionally convey a security alert indicator, possibly in the form of a single bit that indicates whether or not the IO analytics logic 115-1 of the MPIO driver 112-1 currently views the corresponding process as having one or more designated characteristics associated with malware.

The storage array 105 illustratively extracts the process identifiers from respective ones of the received IO operations, for example, by extracting them from CDBs or other command structures of one or more commands of the received IO operations. Other types of extraction techniques can be used.

It is also possible that the security alert indicators can be conveyed from the host device 102-1 to the storage array 105 separately from the process identifiers. For example, the security alert indicators can be inserted into a different field or other portion of a command associated with a given IO operation, than the field or other portion of the command that is used to convey the process identifier.

The other host devices 102 are assumed to operate in a similar manner via their respective instances of MPIO drivers 112 and corresponding path selection logic 114 and IO analytics logic 115.

At least portions of the host devices 102 may each be viewed as an example of what is more generally referred to herein as "at least one processing device" comprising a processor and a memory, with the processor being coupled to the memory. References herein to "at least one processing device" can additionally or alternatively include at least a portion of the storage array 105. Other types of arrangements of one or more processing devices can be used to implement functionality for malware defense utilizing IO analytics as disclosed herein. For example, the storage array 105 can illustratively include multiple sets of one or more processing devices, with each such set corresponding to a different distributed storage node. Each such additional processing device also includes a processor and a memory coupled to the processor, with the additional processing devices being implemented in the respective distributed storage nodes of the storage array 105 and configured to process security alert indicators inserted into respective IO operations by at least one processing device that comprises at least a portion of one or more of the host devices 102.

An example of a process including operations of the type outlined above will be described below in conjunction with the flow diagram of FIG. 2. These and other operations referred to herein as being performed by one or more host devices operating in conjunction with one or more storage arrays of a storage system can in other embodiments involve additional or alternative system components, possibly including one or more external servers such as MPIO management station 116.

As noted above, the initiators of the initiator-target pairs illustratively comprise respective HBAs of the host device 102-1 and the targets of the initiator-target pairs comprise respective storage array ports of the storage array 105.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

In some embodiments, the NPIV feature of FC allows a single host HBA port to expose multiple World Wide Numbers (WWNs) to the SAN 104 and the storage array 105. A WWN or World Wide Identifier (WWID) is a unique identifier used in various types of storage technologies that may be implemented in illustrative embodiments herein, including, for example, SCSI, NVMe, FC, Parallel Advanced Technology Attachment (PATA), Serial Advanced Technology Attachment (SATA), Serial Attached SCSI (SAS) and others, and may be viewed as an example of what is more generally referred to herein as a virtual identifier. The NPIV feature is used, for example, when there are multiple IO producers on a given host device with a need to distinguish which IO is related to which producer.

One such case is a system in which multiple VMs run on a single ESXi server with HBAs. All VMs are using all HBAs but there is a need to be able to distinguish which IO belongs to which VM, for example, in order to implement different SLOs between the various VMs, illustratively at an OS level. Each of the NPIV initiators behaves as if it is a "normal" or physical initiator, in that it logs into a storage array port, requires masking, etc. Another example of NPIV usage is in the context of AIX servers, where different logical partitions each use a different NPIV initiator over the same host HBA port.

Accordingly, in some embodiments, multiple virtual initiators are associated with a single HBA of the host device 102-1 but have respective unique identifiers associated therewith.

Additionally or alternatively, different ones of the multiple virtual initiators are illustratively associated with respective different ones of a plurality of VMs of the host device that share a single HBA of the host device, or a plurality of logical partitions of the host device that share a single HBA of the host device.

Again, numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

These and other illustrative embodiments disclosed herein include functionality for performing IO analytics and generating alerts, with at least portions of that functionality being implemented using one or more MPIO drivers of a multi-path layer of at least one host device. The MPIO drivers can comprise PowerPath® drivers suitably modified to implement the techniques disclosed herein. Other types of host multi-pathing software from other vendors can be similarly modified to implement the techniques disclosed herein. Again, MPIO drivers are not required, and other types of host drivers or more generally other host device components can be used.

As described above, in illustrative embodiments disclosed herein, the host devices 102 are configured to interact with storage array 105 to facilitate implementation of malware defense based at least in part on IO analytics.

An example of multi-layered algorithm performed by one or more of the host devices 102 and the storage array 105 in implementing malware defense utilizing IO analytics will now be described. In the following description, a host device may be referred to as simply a "host." Similarly, a storage array may be referred to as simply an "array."

In a typical ransomware attack, the attacker may have already established a persistent control on a given host device ("host") with high privilege user credentials. At this point the attacker has access to all of the files and all of the host-mounted resources. In many such attacks, the attacker encrypts the files in place (e.g., read, encrypt and write back to the same place) and/or copies encrypted data elsewhere and deletes the source blocks or files, while also possibly changing the file names for additional confusion.

Illustrative embodiments disclosed herein protect against these and other types of malware attacks. In some embodiments, this involves implementation of a multi-layered protective algorithm that defends the host against ransomware and other types of malware. For example, some embodiments implement a protective algorithm in accordance with a Zero Trust Approach (ZTA)—e.g., don't trust—always verify.

In some embodiments, the multi-layered algorithm implements the following functionality, each illustratively implemented in a different layer:

1. Detection. This includes detection of rogue users, detection of rogue processes, and/or detection of unusual modification of data.
2. Alert Generation. This can include inserting security alert indicators into respective IO operations generated by processes that exhibit potentially malicious access patterns. Additionally or alternatively, the alert generation can include alerting one or more administrators ("admins") and/or a system management plane about one or more detected incidents.
3. Protection. This includes terminating or otherwise limiting access of rogue users and/or rogue processes.

These example layers will be described below using the NIST CSF cybersecurity framework—as an example.

As a part of a given deployment or configuration, an administrator today typically configures zoning and masking, in order to identify which hosts and ports can get access to a given LUN or other logical storage volume. In some embodiments, it is assumed that the attacker already has persistent access on the host, but such embodiments provide additional protection for the data stored in the system. For example, the multi-layered algorithm can be configured such that the storage array will only accept IO traffic that is tagged as verified traffic, in accordance with the disclosed techniques.

Detection

The first layer of the multi-layered algorithm detects unauthorized users and/or processes accessing the volume. A given such process can comprise an application or a portion of an application. It is assumed in some embodiments that ransomware has gotten credentials or other access in order to pose as an authentic user and process. In the first layer, the algorithm analyzes activities to detect compromised users and/or processes. This illustratively involves the following steps, although additional or alternative steps could be used, and the order of the steps could be varied, in other embodiments.

1. On application on-boarding, the host MPIO driver (e.g., a suitably modified PowerPath® driver) will record the applications sending the IOs to the LUN (e.g., including process identifiers for the processes that are generating the IOs) and the user logged in at that time. The host operating system has a mechanism to notify user ID and process (also associated with filenames if the volume has a file system) when a volume is accessed. The MPIO software logs all these details, namely, user ID, process name, time, and access type (e.g., read/write, open).
2. As indicated above, there are at least two different basic types of ransomware attacks. In a first type of attack, ransomware overwrites existing files blocks with encrypted data in place, and in a second type of attack, the ransomware creates a copy of each file and encrypts the blocks in new file and then erases the existing files. Both of these attacks are associated with unusual access patterns that are detectable using the techniques disclosed herein.
3. The MPIO software detects unusual access by analyzing the log described above. The term "log" as used herein is intended to be broadly construed, and should not be viewed as limited to any particular arrangement of stored information and/or collection timing. This log is collected for a relatively small time interval (e.g., each second) and analyzed in order to detect conditions such as the following:
   (a) A process suddenly tries to read and then write a large number of blocks within a short interval within a LUN.
   (b) A sequential access pattern during this interval.
   (c) A sudden spike of CPU and memory consumption due to encryption during this interval.
   (d) If there is a file system mounted on the volume, a correlation between original files and encrypted files.
   (e) A high level of entropy on written blocks—this is illustratively done only when the algorithm finds malicious access pattern by analyzing (a) through (d) above.

For example, if ransomware starts encrypting all Microsoft Office documents, the log generated by the MPIO software can be analyzed to derive the following details for a given time interval:

Total CPU Utilization X %
Total Disk Accesses for LUN Z
Sequential Reads P %
Sequential Writes Q %,
Total Read Count
Total Write Count
Filename "xxxx.doc" having co-related Filename "ppxx.doc.qqq"

In some embodiments, historical access information of past versus current activity will reveal an access anomaly.

Once a list of suspected files is obtained, sample blocks of the suspected files are further analyzed for entropy analytics. If files are encrypted, higher entropy will be found.

Suspected activities will be monitored by the MPIO software as indicated above, which will audit (and save to an audit log), as well as examine IO traffic and deploy an anomaly detection engine. The anomaly detection engine in some embodiments will analyze the audit logs (e.g., at line speed or offline every X seconds—depending on the amounts of resources available) and alert on anomalies. Such an anomaly detection engine illustratively comprises or otherwise utilizes IO analytics logic of the type described elsewhere herein, which may be implemented in an MPIO driver or elsewhere in a host device.

Alert Generation

The second layer of the multi-layered algorithm in this framework will alert different system components, admins and/or management planes about the anomaly.

For example, upon detecting a suspected anomaly associated with a ransomware or other malware attack, the MPIO software will alert the host admin, and/or one or more other system entities, such as a security information and event management (STEM) system, a storage cloud management system (e.g., CloudIQ) and the storage array.

Protection

The third layer of the multi-layered algorithm in illustrative embodiments is configured to stop malicious access in real time.

For example, the anomaly detection engine mentioned above will find the process and user ID associated with the malicious access.

The admin and/or management plane can reactively or proactively deny access for the user and the process.

In this layer, the MPIO software will change the tagging of the compromised data to declare it unsecure, and the storage array will block the writes and/or write them to a dedicated location not overwriting valuable data.

Illustrative embodiments provide significant advantages over conventional practice. For example, these embodiments provide an efficient algorithm for malware defense in an information processing system that includes one or more host devices and a storage array or other type of storage system.

The illustrative embodiments can detect ransomware both within block storage and file storage and take appropriate actions in real-time.

Some embodiments apply a ZTA that involves collaboration between hosts and a storage array to defeat ransomware and other types of malware.

As indicated previously, illustrative embodiments disclosed herein can protect against ransomware attacks as well as other types of malware attacks.

Another example implementation will now be described in more detail with respect to a ransomware attack.

The main focus of ransomware attacks is the encryption of user files, and therefore the ransomware will typically read the data, write the data and remove the original data afterwards. This attack is implemented in various ways by different ransomware variants. The diverse implementations can be generally classified into two types:

1. In-place encryption—Replaces the data of a file in-place. It first reads the data from the file then encrypts it, writes the encrypted data back to the file, and closes it. Afterwards, the file is optionally renamed.
2. Out-of-place encryption—Creates a new file and moves the data to the new file by reading the content from the original file, encrypting it and writing.

The sequence of attack generally proceeds as follows. File encryption performed as part of a ransomware attack typically involves different sequences of read/write operations such as batch reads followed by batch writes and then a rename/delete of the original file or interleaved read/write operations and then a rename/delete. From these sequences, an anomaly detection engine of the type described above can detect potentially malicious patterns of read/write counts and read/write ratios, as a ransomware attack will typically produce unusually high read/write count in an approximately equivalent ratio.

Features that can indicate the ransomware attack, for a wide variety of different variants of such an attack, illustratively include the following, although additional or alternative features can be used in IO analytics herein:

1. Read/write count. Number of reads and number of writes occurring per designated time period (e.g., per second). Legitimate users will typically not perform very large numbers of read/write operations in approximately equal ratio, and even if a given user were to do so, it would not happen frequently. Accordingly, the IO analytics logic illustratively calculates the number of reads and writes per second.
2. Process name. A process name can be indicative of ransomware attack. For example, a newly created process doing large numbers of reads and writes can be indicative of ransomware attack. Other types of operations, such as move, delete, rename, and copy operations, are much less frequent and therefore the primary focus in illustrative embodiments is on read and write operations.
3. Is_script. Ransomware attacks often happen through one or more scripts, such as Java, Python or shell scripts. So if the process which is generating IO operations targeting one or more files of a logical storage volume comprises such a script, it is considered an indicator of a possible ransomware attack. The process name is also stored so that the process can be blocked if appropriate. The process name in some embodiments may indicate whether or not the process comprises a script.
4. Is_subset. In a typical ransomware attack, a targeted file is encrypted. The original file is deleted and the encrypted file is saved with a new name, or with the same name but a different file extension (e.g., .xyz becomes .abc). So if a destination file name includes as a subset thereof the name of the corresponding source file, it is considered an indicator of a possible ransomware attack.
5. Linux user ID. A Linux user ID in combination with one or more other features can also indicate a possible ransomware attack by a particular user. For example, read and write counts of a particular user identified by a corresponding Linux user ID may be indicative of a ransomware attack by that user. Also, a malware defense action can block a particular user if the Linux user ID is available.
6. Entropy. The Shannon entropy is a measurement of the amount of information in a file. Files with a high entropy include, for example, compressed and encrypted files, where the information level is reduced to gain a specific property of compression or encryption. A ransomware attack will typically change the entropy of files to a higher average entropy due to the encryption of files, and such an entropy increase is considered an indicator of a possible ransomware attack.

The example algorithms, features and other functionality described above are in some embodiments implemented at least in part utilizing MPIO drivers of respective host devices, but other embodiments can be implemented outside of any multi-pathing software of the host devices. For example, other host device components can be used to perform IO analytics, to insert security alert indicators into respective IO operations, and to collaborate with the storage array to implement aspects of malware defense.

It should also be noted that the example algorithms described herein are not limited to use with particular types of IOs or IO command formats. For example, IOs comprising one or more commands of a standard storage access protocol, such as the above-noted SCSI and NVMe access protocols, can be utilized.

It is to be appreciated that the particular algorithm steps described above and elsewhere herein are presented by way of illustrative example only, and additional or alternative steps can be used in other embodiments. Also, the order of the steps can be varied, and/or at least some of the steps can be performed at least in part in parallel with one another. Other arrangements of IO analytics for malware defense can be used in other embodiments.

Additional examples of illustrative embodiments implementing functionality for malware defense utilizing IO analytics will now be described with reference to FIGS. 2 through 4.

Figure 2:
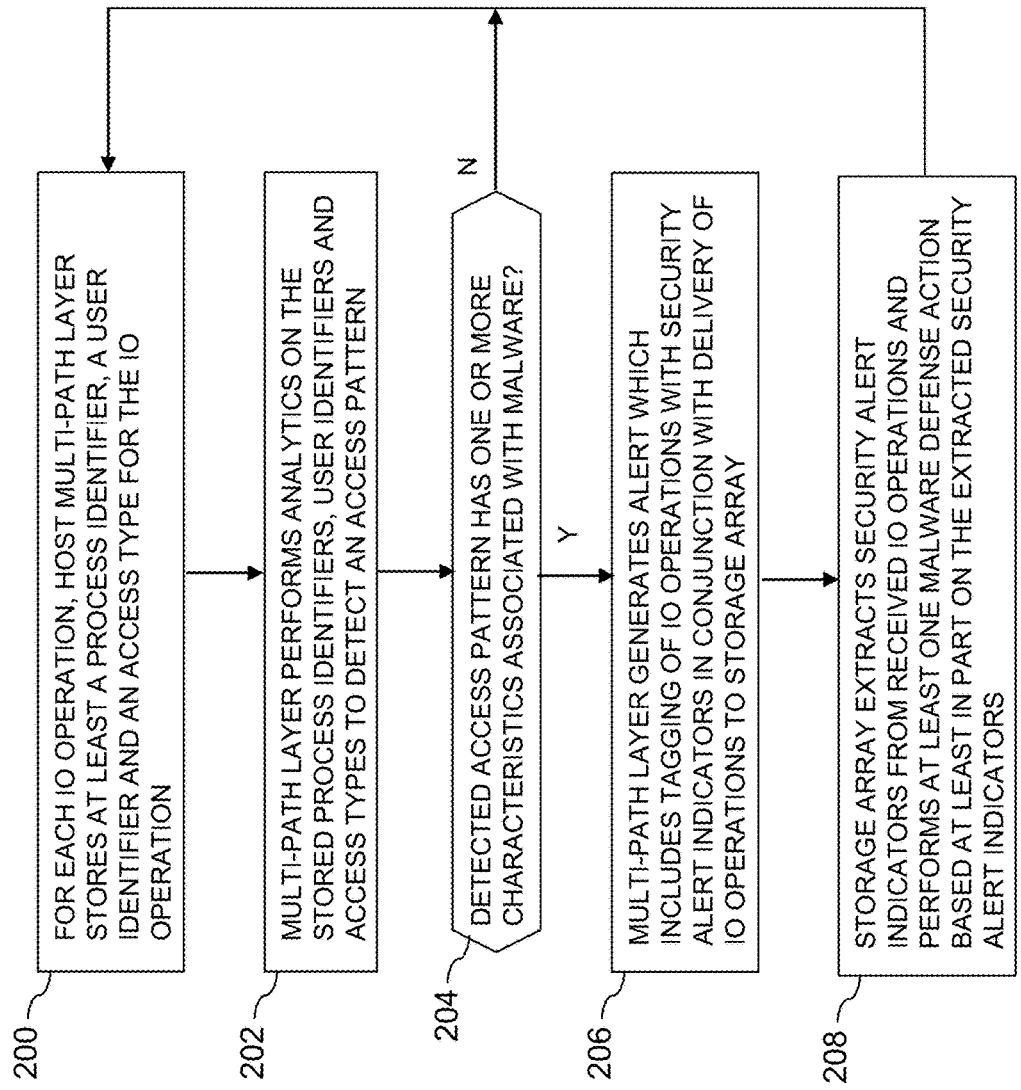
FIG. 2 is a flow diagram of an example process implementing IO analytics for malware defense in a host multi-path layer in an illustrative embodiment.

Referring initially to FIG. 2, an example process for malware defense utilizing IO analytics is illustrated. The process as shown includes steps 200 through 208, and is suitable for use in the system 100 but is more generally applicable to other types of systems comprising at least one host device and a storage system. The storage system in this embodiment is assumed to comprise at least one storage array having a plurality of storage devices. The storage devices illustratively include logical storage devices such as LUNs or other logical storage volumes. The process includes host-side portions comprising steps 200 through 206, and storage-side portions comprising step 208.

The host-side portions of the FIG. 2 process are illustratively performed at least in part by or under the control of a multi-path layer comprising one or more MPIO drivers of respective host devices, such as host devices 102 of FIG. 1, cooperatively interacting with a storage array or other storage system, and possibly some participation by one or more additional components such as an external server comprising an MPIO management station, although use of an external server is not a requirement of this or other embodiments.

The storage-side portions of the FIG. 2 process are illustratively performed by a storage array such as storage array 105 of FIG. 1. Other arrangements of additional or alternative system components can be configured to perform at least portions of one or more of the steps of the FIG. 2 process in other embodiments.

In step 200, for each of a plurality of IO operations that are generated by one or more application processes executing on a host device and that target one or more logical storage volumes of a storage array, a multi-path layer of the host device stores at least a process identifier, a user identifier and an access type for the IO operation. Additional or alternative information can be stored in other embodiments, such as a timestamp for the IO operation. The information is illustratively stored in one or more logs that capture such information from IO operations over designated time periods. The multi-path layer illustratively comprises at least one MPIO driver of the host device, and may additionally or alternatively include at least portions of one or more other devices, such as at least a portion of an MPIO management station or other arrangement of one or more external servers.

In step 202, the multi-path layer performs analytics on the stored process identifiers, user identifiers and access types to detect an access pattern.

In step 204, a determination is made as to whether or not the detected access pattern has one or more characteristics associated with malware. Responsive to an affirmative determination, the process moves to step 206, and otherwise returns to step 200 as indicated.

In step 206, which is reached if the detected access pattern has one or more characteristics associated with malware, the multi-path layer generates an alert which illustratively includes tagging of IO operations with security alert indicators in conjunction with delivery of the IO operations to the storage array. Other types of alerts can additionally or alternatively be generated in other embodiments.

Examples of techniques that can be used to insert such security alert indicators as tags into IO operations are disclosed in the above-cited U.S. Pat. No. 10,474,367, although additional or alternative techniques could be used. As indicated previously, terms such as "insertion" as used herein in relation to tags or other types of process identifiers are intended to be broadly construed, so as to encompass a wide variety of different arrangements for associating such identifiers with respective IO operations. The process identifiers in some embodiments illustratively include or are otherwise associated with the security alert indicators, as described elsewhere herein. For example, a bit can be added to a process identifier to indicate whether or not the corresponding process is viewed as potentially malicious based at least in part on the IO analytics performed by the host device.

In step 208, the storage array extracts the security alert indicators from the received JO operations and performs at least one malware defense action based at least in part on the extracted security alert indicators.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and IO analytics functionality for malware defense. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements for malware defense for different host devices.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
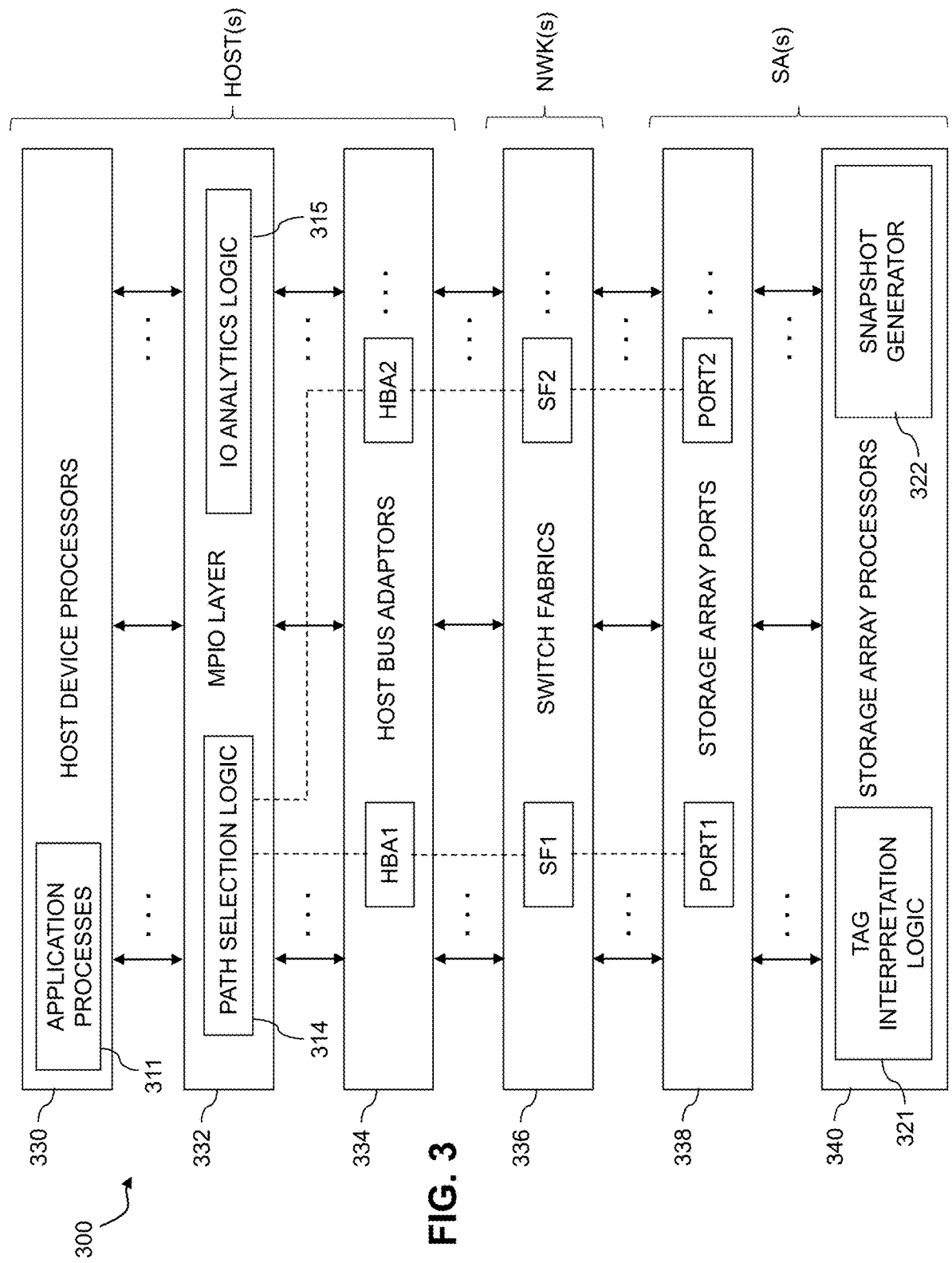
FIG. 3 is a block diagram showing multiple layers of a layered system architecture that includes a host multi-path layer with IO analytics for malware defense in an illustrative embodiment.

Referring now to FIG. 3, another illustrative embodiment is shown. In this embodiment, an information processing system 300 comprises host-side elements that include application processes 311, path selection logic 314 and IO analytics logic 315. There are illustratively separate instances of one or more such host-side elements associated with each of a plurality of host devices of the system 300.

The system 300 further comprises storage-side elements that include tag interpretation logic 321 and a snapshot generator 322. There may be separate instances of one or more such storage-side elements associated with each of a plurality of storage arrays of the system 300.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The host device processors of the host device processor layer 330 can comprise, for example, respective VMs and/or processor virtualization containers (e.g., Docker containers), or additional or alternative processing entities that generate IO operations for delivery to one or more storage arrays.

The storage array processors of the storage array processor layer 340 may be viewed as corresponding to one or more storage controllers such as the storage controllers 120 of the storage array 105.

The application processes 311 of the host device processor layer 330 generate IO operations that are processed by the MPIO layer 332 for delivery to the one or more storage arrays over the SAN comprising switch fabrics of switch fabric layer 336, with process identifiers inserted in respective ones of the IO operations as disclosed herein. Paths are determined by the path selection logic 314 for sending such IO operations to the one or more storage arrays.

The MPIO layer 332 is an example of what is also referred to herein as a multi-path layer, and comprises one or more MPIO drivers implemented in respective host devices. Each such MPIO driver illustratively comprises respective instances of path selection logic 314 and IO analytics logic 315 configured as previously described. Additional or alternative layers and logic arrangements can be used in other embodiments.

In a manner similar to that described elsewhere herein, the MPIO layer 332 comprising IO analytics logic 315 illustratively processes a plurality of IO operations generated by a given host device. The IO operations are sent by the MPIO layer 332 to a storage array over respective paths selected using one or more algorithms implemented by path selection logic 314, with process identifiers inserted in each such IO operation to indicate a corresponding VM, processor virtualization container and/or host device that generated the corresponding IO operation.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of k paths to a shared storage array, or alternatively different ones of the host devices can have different numbers and types of paths to the storage array.

The path selection logic 314 of the MPIO layer 332 in this embodiment selects paths for delivery of IO operations to the one or more storage arrays having the storage array ports of the storage array port layer 338. More particularly, the path selection logic 314 determines appropriate paths over which to send particular IO operations to particular logical storage devices of the one or more storage arrays.

In an example process for malware defense utilizing IO analytics in the system 300, an MPIO driver of the MPIO layer 332, for each of a plurality of IO operations, stores at least a process identifier, a user identifier and an access type for the IO operation, performs analytics on the stored process identifiers, user identifiers and access types to detect an access pattern, and responsive to the detected access pattern having one or more designated characteristics associated with malware, generates an alert.

For example, in generating the alert, the MPIO driver illustratively inserts security alert indicators into respective ones of the IO operations delivered from the corresponding host device to a storage array to indicate that the detected access pattern for those IO operations has one or more designated characteristics associated with malware. The storage array receives the IO operations from the host device over a network, extracts the security alert indicators from respective ones of the received IO operations, and performs a particular malware defense action for at least one logical storage volume based at least in part on the extracted security alert indicators. Detection and interpretation of the security alert indicators is illustratively performed by the tag interpretation logic 321, which can trigger one or more malware defense actions based at least in part on the security alert indicators. Such malware defense actions can include, for example, generating a snapshot of the logical storage volume using snapshot generator 322, and/or preventing the IO operations from modifying the logical storage volume. Numerous other types of malware defense actions can be performed based at least in part on process identifiers extracted from IO operations.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of IO host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Figure 4:
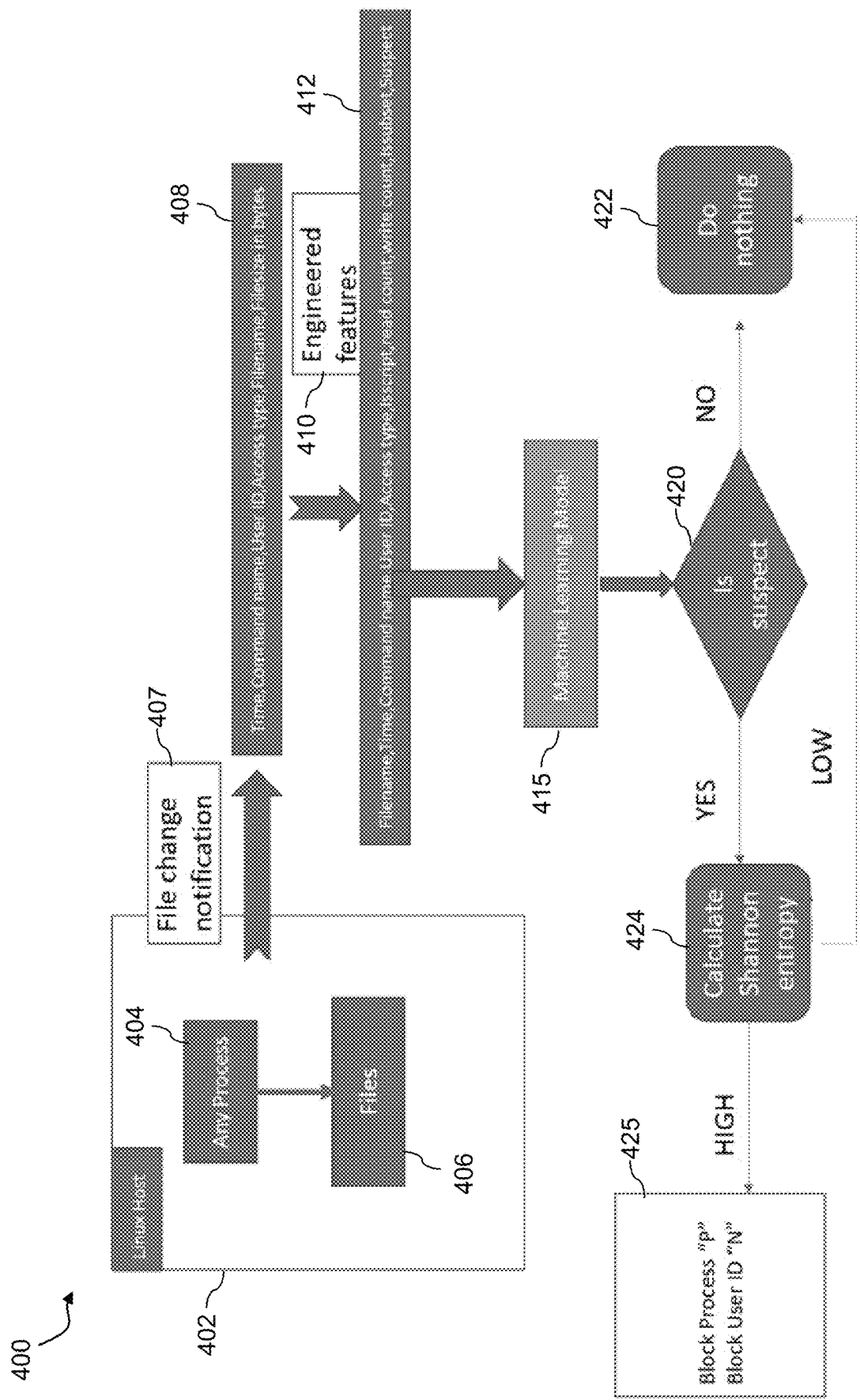
FIG. 4 is a block diagram of an information processing system that utilizes machine learning to implement at least portions of IO analytics for malware defense in an illustrative embodiment.

Referring now to FIG. 4, an information processing system 400 comprises a host device 402, illustratively implemented as a Linux host. It is assumed that the host device 402 communicates with a storage system in the manner described elsewhere herein, although the storage system is not explicitly shown in this figure. In the host device 402, a process 404, which could be any process executing on the host device 402, generates IO operations that target data of a plurality of files 406. The host device 402 is configured to utilize a file change notification 407 relating to one or more of the files 406 to trigger collection and storage of related information 408, illustratively including in the present embodiment the current time (e.g., a timestamp), command name, user ID, access type, file name and file size in bytes. Additional information that is stored in this embodiment is a process name for the process 404, which is assumed to be process P. The user ID is assumed to be user ID N. The host device 402 also generates engineered features 410, which results in updated information 412, including is_script, read count, write count, is_subset, and suspect, as previously described herein.

The updated information 412 is applied as input to a machine learning model 415, which generates a classification output that is further processed in steps 420 through 425 as shown. In step 420, a determination is made as to whether or not the process 404 is considered suspect based on the classification output of the machine learning model 415. If the determination in step 420 is negative, nothing further is done in terms of malware defense actions for that process, as indicated in step 422. If the determination in step 420 is affirmative, the Shannon entropy is calculated in step 424. If the Shannon entropy calculated in step 424 is above a specified threshold, it is considered high and so malware defense actions are performed in step 425. These illustratively include blocking process P and user ID N. Otherwise, the calculated Shannon entropy is considered low, and nothing further is done in terms of malware defense actions for that process, as indicated in step 422.

In the FIG. 4 embodiment, the file change notification 407 is illustratively generated using a Linux file notify framework, illustratively with a fanotify API that provides interception and notification of file system events. Hooks were added to notifying respective events when a file is opened, accessed via read, modified via write, and closed. Additional or alternative events and associated notification mechanisms can be used in other embodiments. For each such event, the information 408 is obtained, including the file name for the access, the process name for the process that is accessing the file, the user ID of the user that has launched the process, and a timestamp for the access. The engineered features 410 such as read/write counts, is_script, is_subset and suspect are then added to information 408 to provide information 412. The machine learning model 415 is trained on multiple such datasets characterizing normal and ransomware attack scenarios. In some embodiments, the machine learning model 415 was implemented as a random forest classifier, although a wide variety of other machine learning models and associated machine learning systems can be used in other embodiments.

The example malware defense actions performed in step 425 can be implemented in a storage system, illustratively via the host device 402 sending alerts such as the security alert indicators described elsewhere herein. Other portions of the FIG. 4 functionality, such as collection of information 408 and 412, implementation of the machine learning model 415, and steps 420, 422 and 424, can be implemented in the host device 402, although not explicitly shown as such in the figure. It is also possible that at least portions of such functionality can be implemented in an external server, such as an MPIO management station 116, or in different distributed implementations across the host device 402, the storage system and possibly one or more external servers.

The above-described processes, algorithms and other features and functionality disclosed herein are presented by way of illustrative example only, and other embodiments can utilize additional or alternative arrangements.

Also, as mentioned previously, different instances of the above-described processes, algorithms and other techniques for malware defense utilizing IO analytics can be performed using different system components.

For example, various aspects of IO analytics functionality for malware defense in some embodiments can be implemented at least in part using one or more servers that are external to a storage array 105 or other type of storage system. Also, IO analytics logic can be implemented using other types of host drivers, such as, for example, SCSI drivers, NVMe drivers or more generally other host device components.

The particular arrangements described above for implementing malware defense utilizing IO analytics are therefore presented by way of illustrative example only. Numerous alternative arrangements of these and other features can be used in implementing malware defense in other illustrative embodiments.

As indicated previously, the illustrative embodiments disclosed herein can provide a number of significant advantages relative to conventional arrangements.

For example, some embodiments are advantageously configured to provide security alert indicators or other types of alerts for respective IO operations from one or more host devices to a storage array or other storage system in order to facilitate performance of malware defense actions in the storage system.

Illustrative embodiments advantageously avoid problems of conventional practice, by allowing the storage system to make more informed decisions in its malware defense, thereby resulting in improved overall performance.

Some embodiments provide efficient algorithms for malware defense that leverage collaboration between host devices and a storage array.

Various aspects of functionality associated with malware defense utilizing IO analytics as disclosed herein can be implemented in a host device, in a storage system, or partially in a host device and partially in a storage system, and additionally or alternatively using other arrangements of one or more processing devices each comprising at least a processor and a memory coupled to the processor.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems implemented at least in part using virtualization infrastructure such as virtual machines and associated hypervisors. For example, virtual machines provided in such systems can be used to implement a fast tier or other front-end tier of a multi-tier storage system in illustrative embodiments. A capacity tier or other back-end tier of such a multi-tier storage system can be implemented using one or more object stores.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 and IO analytics logic 115 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage devices, processors, memories, logic instances, and additional or alternative components. Also, the particular configurations of system and device elements and associated processing operations illustratively shown in the drawings can be varied in other embodiments. For example, a wide variety of different host device and storage system configurations and associated arrangements for malware defense utilizing IO analytics can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to implement a multi-path layer in a host device, the multi-path layer controlling delivery of input-output (IO) operations from the host device to a storage system over selected ones of a plurality of paths through a network, the multi-path layer being within the host device;

wherein the multi-path layer is configured:

for each of at least a subset of the IO operations, to store at least a process identifier, a user identifier and an access type for the IO operation;

to perform analytics on the stored process identifiers, user identifiers and access types to detect an access pattern; and responsive to the detected access pattern having one or more designated characteristics associated with malware, to generate an alert and to send the alert from the host device to the storage system, the alert comprising a malware alert for the storage system from the host device;

wherein generating the alert comprises inserting security alert indicators into respective ones of the IO operations delivered from the host device to the storage system to indicate that the detected access pattern for those IO operations has one or more designated characteristics associated with malware.

2. The apparatus of claim 1 wherein the at least one processing device comprises at least a portion of the host device.

3. The apparatus of claim 2 wherein the at least one processing device comprises at least a first processing device of the host device and at least a second processing device of the storage system.

4. The apparatus of claim 1 wherein the multi-path layer comprises one or more multi- path IO (MPIO) drivers of the host device.

5. The apparatus of claim 1 wherein the process identifiers indicate respective ones of one or more application processes that generated the IO operations on the host device, the user identifier indicates a particular user for which the application processes are executed in the host device, and the access type indicates for a given one of the IO operations whether the IO operation is a read operation or a write operation.

6. The apparatus of claim 1 wherein the multi-path layer is further configured to insert the process identifiers into respective ones of the IO operations in conjunction with controlling delivery of the IO operations from the host device to the storage system over selected ones of the plurality of paths through the network.

7. The apparatus of claim 1 wherein the at least one processing device is further configured:

to receive the IO operations from the host device over the network;

to extract the security alert indicators from respective ones of the received IO operations; and to perform a particular malware defense action for at least one logical storage volume based at least in part on the extracted security alert indicators.

8. The apparatus of claim 7 wherein performing a particular malware defense action for at least one logical storage volume based at least in part on the extracted security alert indicators comprises generating a snapshot of the logical storage volume.

9. The apparatus of claim 7 wherein performing a particular malware defense action for at least one logical storage volume based at least in part on the extracted security alert indicators comprises preventing the IO operations from modifying the logical storage volume.

10. The apparatus of claim 1 wherein performing analytics on the stored process identifiers, user identifiers and access types to detect an access pattern comprises:

determining a number of read operations directed to a particular logical storage volume within a given time interval;

determining a number of write operations directed to the particular logical storage volume within the given time interval; and detecting the access pattern based at least in part on the determined number of read operations and the determined number of write operations.

11. The apparatus of claim 1 wherein performing analytics on the stored process identifiers, user identifiers and access types to detect an access pattern comprises identifying an access pattern characterized by at least one of the following:

a newly-created process performing both read operations and write operations directed to a particular logical storage volume;

a process that utilizes one or more scripts to perform both read operations and write operations directed to the particular logical storage volume;

a sequential access pattern comprising both read operations and write operations directed to the particular logical storage volume;

a substantial increase in usage of computation and memory resources; and a particular type of correlation between one or more original files and one or more modified files.

12. The apparatus of claim 1 wherein the at least one processing device is further configured:

to identify one or more suspect accesses based at least in part on the detected access pattern;

to determine an entropy of one or more files targeted by the one or more suspect accesses; and to block further access of a corresponding process and user identifier responsive to the determined entropy being greater than a threshold entropy level.

13. The apparatus of claim 1 wherein performing analytics on the stored process identifiers, user identifiers and access types to detect an access pattern comprises:

training a machine learning model; and utilizing the trained machine learning model to detect the access pattern.

14. A computer program product comprising a non-transitory processor-readable storage medium having stored therein program code of one or more software programs, wherein the program code, when executed by at least one processing device comprising a processor coupled to a memory, causes the at least one processing device:

to implement a multi-path layer in a host device, the multi-path layer controlling delivery of input-output (IO) operations from the host device to a storage system over selected ones of a plurality of paths through a network, the multi-path layer being within the host device;

wherein the multi-path layer is configured:

for each of at least a subset of the IO operations, to store at least a process identifier, a user identifier and an access type for the IO operation;

to perform analytics on the stored process identifiers, user identifiers and access types to detect an access pattern; and responsive to the detected access pattern having one or more designated characteristics associated with malware, to generate an alert and to send the alert from the host device to the storage system, the alert comprising a malware alert for the storage system from the host device;

wherein generating the alert comprises inserting security alert indicators into respective ones of the IO operations delivered from the host device to the storage system to indicate that the detected access pattern for those IO operations has one or more designated characteristics associated with malware.

15. The computer program product of claim 14 wherein the program code, when executed by the at least one processing device, further causes the at least one processing device:

to receive the IO operations from the host device over the network;

to extract the security alert indicators from respective ones of the received IO operations; and to perform a particular malware defense action for at least one logical storage volume based at least in part on the extracted security alert indicators.

16. A method comprising:

implementing a multi-path layer in a host device, the multi-path layer controlling delivery of input-output (IO) operations from the host device to a storage system over selected ones of a plurality of paths through a network, the multi-path layer being within the host device;

wherein steps performed by the multi-path layer comprise:

for each of at least a subset of the IO operations, storing at least a process identifier, a user identifier and an access type for the IO operation;

performing analytics on the stored process identifiers, user identifiers and access types to detect an access pattern; and responsive to the detected access pattern having one or more designated characteristics associated with malware, generating an alert and sending the alert from the host device to the storage system, the alert comprising a malware alert for the storage system from the host device;

wherein generating the alert comprises inserting security alert indicators into respective ones of the IO operations delivered from the host device to the storage system to indicate that the detected access pattern for those IO operations has one or more designated characteristics associated with malware.

17. The method of claim 16 further comprising:

receiving the IO operations from the host device over the network;

extracting the security alert indicators from respective ones of the received IO operations; and performing a particular malware defense action for at least one logical storage volume based at least in part on the extracted security alert indicators.

18. The method of claim 16 wherein performing analytics on the stored process identifiers, user identifiers and access types to detect an access pattern comprises identifying an access pattern characterized by at least one of the following:

a newly-created process performing both read operations and write operations directed to a particular logical storage volume;

a process that utilizes one or more scripts to perform both read operations and write operations directed to the particular logical storage volume;

a sequential access pattern comprising both read operations and write operations directed to the particular logical storage volume;

a substantial increase in usage of computation and memory resources; and a particular type of correlation between one or more original files and one or more modified files.

19. The method of claim 16 further comprising:

identifying one or more suspect accesses based at least in part on the detected access pattern;

determining an entropy of one or more files targeted by the one or more suspect accesses; and blocking further access of a corresponding process and user identifier responsive to the determined entropy being greater than a threshold entropy level.

20. The method of claim 16 wherein performing analytics on the stored process identifiers, user identifiers and access types to detect an access pattern comprises:

training a machine learning model; and utilizing the trained machine learning model to detect the access pattern.

\* \* \* \* \*